United States Patent
Schook

(10) Patent No.: US 9,039,799 B2
(45) Date of Patent: May 26, 2015

(54) DRAINED COALESCER

(75) Inventor: Robert Schook, Steenderen (NL)

(73) Assignee: Advanced Technologies & Innovations B. V., Arnhem (NL)

( * ) Notice: Subject to any disclaimer, the term of this patent is extended or adjusted under 35 U.S.C. 154(b) by 489 days.

(21) Appl. No.: 13/393,876

(22) PCT Filed: Sep. 1, 2010

(86) PCT No.: PCT/NL2010/050546
§ 371 (c)(1),
(2), (4) Date: Feb. 14, 2013

(87) PCT Pub. No.: WO2011/028108
PCT Pub. Date: Mar. 10, 2011

(65) Prior Publication Data
US 2013/0276416 A1 Oct. 24, 2013

(30) Foreign Application Priority Data
Sep. 4, 2009 (NL) ..................................... 2003437

(51) Int. Cl.
*B01D 50/00* (2006.01)
*B01D 45/08* (2006.01)
*B01D 45/06* (2006.01)
*B01D 46/00* (2006.01)

(52) U.S. Cl.
CPC ................ *B01D 45/08* (2013.01); *B01D 45/06* (2013.01); *B01D 46/0031* (2013.01); *B01D 46/0045* (2013.01); *B01D 50/002* (2013.01); *B01D 2267/70* (2013.01); *B01D 2275/10* (2013.01)

(58) Field of Classification Search
CPC ........ B01D 45/06; B01D 45/08; B01D 46/31; B01D 46/45; B01D 46/2407
USPC ........... 55/267, 320, 435, 440, 462, 487, 498, 55/520, 525, 529; 95/267, 286; 96/190
See application file for complete search history.

(56) References Cited

U.S. PATENT DOCUMENTS

| | | | |
|---|---|---|---|
| 4,818,257 A * | 4/1989 | Kennedy et al. ................ 95/286 |
| 5,112,375 A | 5/1992 | Brown | |
| 5,264,137 A | 11/1993 | McCullough, Jr. et al. | |
| 6,080,228 A | 6/2000 | Okada et al. | |
| 6,770,121 B1 * | 8/2004 | Sindel ............................ 95/267 |
| 2003/0014951 A1 | 1/2003 | Crouse | |

FOREIGN PATENT DOCUMENTS

| | | |
|---|---|---|
| JP | 775713 A | 3/1995 |
| WO | 2005023396 A1 | 3/2005 |

* cited by examiner

*Primary Examiner* — Jason M Greene
*Assistant Examiner* — Karla Hawkins
(74) *Attorney, Agent, or Firm* — The Webb Law Firm

(57) ABSTRACT

Provided is an apparatus for separating liquid from a gas/liquid mixture, including: a housing; a gas/liquid mixture inlet located at a lower side of the housing; a coalescer placed in the housing above the gas/liquid mixture inlet for extending the volume of liquid droplets from the mixture passing the coalescer; at least one liquid feed, which liquid feed runs at least partially through the coalescer and ends at location below the gas/liquid mixture inlet; a liquid outlet for the separated liquid fraction located at a lower side of the housing under the coalescer; and a gas outlet for the separated gas fraction located at an upper side of the housing above the coalescer.

19 Claims, 5 Drawing Sheets

DRAINED COALESCER

BACKGROUND OF THE INVENTION

1) Field of the Invention

The present invention relates to an apparatus for separating liquid from a gas/liquid mixture, comprising: a housing; a gas/liquid mixture inlet located at a lower side of the housing; a coalescer placed in the housing above the gas/liquid mixture inlet for extending the volume of liquid droplets from the mixture passing the coalescer; at least one liquid feed, which liquid feed runs at least partially through the coalescer and ends at location below the gas/liquid mixture inlet; a liquid outlet for the separated liquid fraction located at a lower side of the housing under the coalescer; and a gas outlet for the separated gas fraction located at an upper side of the housing above the coalescer.

2) Description of Related Art

Such coalescers are used in the technology field of extraction of hydrocarbons (oil and gas). The extracted product usually consists liquid (oil and water) and gas to be primary separated in e.g. cyclone separators. The resulting mainly gas phase fraction from such primary separation normally still contains a substantial amount of smaller liquid droplets to be further separated in a coalescer. Such a coalescer is also known as a "demister" and makes use of a porous material or vanes placed in a vertical or horizontal tube (vessel) where through in upward direction the gas/liquid mixture is fed. During passage of the coalescer a part of the (relatively small) liquid particles (droplets) in the gas/liquid mixture will collide with the coalescer material resulting in growth of the average particle size. Dependent on the upward speed of the supplied gas/liquid mixture due top gravity the larger droplets will drop to the underside of the housing in—normally—a liquid bath. In this respect is also observed that already during the feed of the mixture in the housing (thus before passing the coalescer) larger liquid particles may directly drop down in the housing. The gas/liquid mixture inlet is normally located above the liquid bath in the housing. At higher upward speeds of the supplied gas/liquid mixture a part of the larger (and also smaller) droplets are carried along the coalescer resulting in a bubbling liquid layer on top of the coalescer from where liquid particles easily can be carried along with the gas phase fraction as droplets may be released again from the bubbling liquid layer. This will result in an over all lower separation. The bubbling liquid layer has as a further disadvantage that it prevents the proper functioning of the coalescer. An overloaded coalescer is "supersaturated". The supersaturating of the coalescer is dependent on among others the velocity of the gas/liquid-mixture, the types of gas and the liquid. The skilled person is aware that supersaturation occurs when the K-value is ≥0.1. Also there apply high shear forces in the bubbling liquid layer. Finally the substantially separated fractions leave the housing via a liquid outlet that is located under the coalescer; and a gas outlet that is located at the upper side of the housing. The underside of the housing thereby normally acts as collecting means for the liquid leaving the liquid feed and falling downward from the coalescer and for the fluid fed back via the at least one liquid feed. The gas outlet is for discharging the gas fraction the dried (or at least drier) gas from the top of the housing, whereby the gas fraction still may contain liquid, however in a smaller proportion than the liquid fraction in the gas/liquid mixture originally fed to the housing.

To release the coalescer from the bubbling liquid layer coalescers are provided with one or more liquid feeds (also known as downcomers or through feeds) which runs through the coalescer to transport the liquid to a location below the coalescer, preferably the below the gas/liquid mixture inlet.

The known demisters have limited separation results and a limited capacity due to the limitation of the maximum upward speed of the gas/liquid mixture for proper functioning.

SUMMARY OF THE INVENTION

It is an object of the present invention to provide an apparatus for separating liquid from a gas/liquid mixture of the introductorily stated type having an improved capacity and separation efficiency than the prior art apparatus for separating liquid from a gas/liquid mixture.

The present invention provides an apparatus of the introductorily stated type wherein the coalescer comprises at least two different coalescer layers. An important advantage of at least two different coalescer layers is that a first coalescer layer causes the first concentration of the liquid particles by the accumulation of the originally small liquid particles in, in average, larger liquid droplets of a typical size. Now a subsequent (second or further) coalescer layer is typically selected such that it causes the in average larger liquid droplets having a typical first size to coalesce even further to in average further enlarged liquid droplets having a typical second size. Making use of the at least two different coalescer layers enable a further extending of the average volume of the liquid droplets that pass the coalescer according the present invention than a prior art coalescer. The larger average volume of the liquid droplets resulting lead to a higher separation rate than can be realised with a prior coalescer having comparable dimensions as the larger the liquid particles (droplets) become the easier they are caught. The effect of the multi-stage enlargement of liquid particles in the coalescer can be further optimised in case the different coalescer layers comprise different types of coalescer materials or in case the different coalescer layers comprise identical types of coalescer materials however with different dimensioning of these stacked coalescer layers.

Remark is made that for a proper functioning the coalescer is placed in the housing such that the passage from the gas/liquid mixture inlet to the gas outlet exclusively lead through the different coalescer layers (hence there is no free passage leading around the coalescer layers; at least two coalescer layers extend over the complete cross-section of the housing that is free for passage of the gas/liquid mixture. A further remark in this respect is that proper functioning also requires the coalescer layers to be placed in a substantially horizontal positions.

A further improvement for leading down as much as possible of the liquid particles to the lower side of the housing could be to provide the apparatus with plural liquid feeds. In order to prevent a substantial amount of liquid collecting on top of the coalescer the coalescer may in a preferred embodiment be provided with liquid feeds liquid located in (that is to say between the upper ands lower side of) the coalescer. However as an alternative it is also possible that the liquid collectors are located above the coalescer. To transport as much as liquid through the liquid feed(s) the apparatus may also comprise liquid collectors connecting to the at least one liquid feed. For transportation of the liquid via gravity the liquid collectors preferably slope downward to the at least one liquid feed. However the apparatus may also comprises plural liquid collectors located on different vertical levels. Such liquid collectors may be embodied as upside opened drains.

As the bottle neck for the over all separating capacity of the apparatus according the present invention is often determined by the capacity of the liquid collectors and liquid feeds the design of both is highly. The at least one liquid feed may for instance be located at a central location; that means on a distance of the wall of the housing. And the collection of liquid may also be supported in case the upper part of the coalescer slopes downward to a liquid feed. The most simple embodiment of the liquid feed is the apparatus comprises only one liquid feed that coaxially located in a vertical cylindrical housing (vessel).

By selecting the different types and the dimensioning of the coalescer layers for specific applications at least one of the coalescer layers may be embodied as a mesh coalescer and/or at least one of the coalescer layers may be embodied as a lamellar coalescer. Good results are realised with a lower (metal) mesh coalesces on which mesh coalescer layer a packages of vanes is stacked. However for the coalescer layers also alternatives may be selected e.g. from any other porous medium with a porosity higher than 75%.

BRIEF DESCRIPTION OF THE DRAWINGS

The invention is further elucidated on the basis of the non-limitative exemplary embodiments shown in the following figures. Herein.

DETAILED DESCRIPTION OF THE PREFERRED EMBODIMENTS

Figure 1:
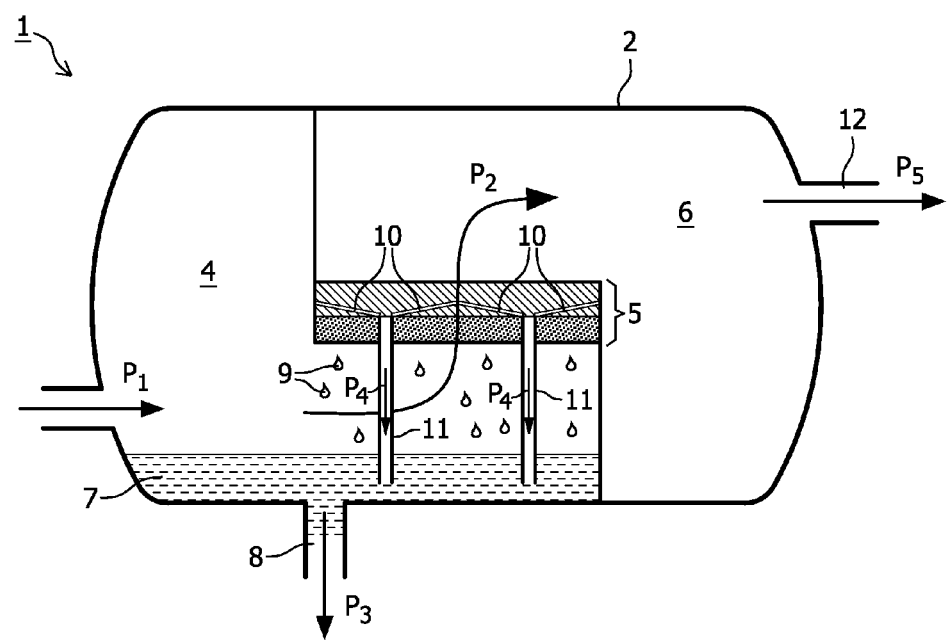
FIG. 1 shows a schematic cross-section through an apparatus for separating liquid from a gas/liquid mixture according to the invention.

FIG. 1 shows an apparatus 1 for processing a gas/liquid mixture that enters a horizontal vessel 2 via an inlet 3 according arrow $P_1$. The gas/liquid mixture enters a first compartment 4 of the vessel 2 from where the mixture flows through a dual coalescer element 5 as indicated with arrow $P_2$ thus entering a second compartment 6 of the vessel 2. The coalescer element 5 is disposed horizontally in the vessel 2 and forms a separation between first compartment 4 and second compartment 6. Already in the first compartment 4 larger liquid particles that separate from the gas/liquid mixture will drop down to arrive in a reservoir 7 (receptacle) holding liquid. This reservoir 7 is part of the first compartment 4 and formed out of wall parts from the vessel 2. The reservoir 7 is at a lower position provided with a liquid outlet 8 to drain liquid fro the apparatus as indicated with arrow $P_3$.

During passage of the coalescer element 5 the average size of the liquid particles in the gas/liquid mixture will increase resulting in a part of the resulting larger liquid droplets 9 falling down (raining) in the reservoir 7. Another part of the liquid particles in the gas/liquid mixture will be caught by liquid collectors 10 located in (or above) the coalescer element 5 that will lead the liquid collected to downcomers 11 (liquid feeds, conduits) extending to below the level of the liquid in the reservoir 7. Through the downcomers 11 the liquid will be transported to the reservoir 7 as indicated with arrows $P_4$. In more detailed the functioning of the coalescer element 5 will be elucidated in relation to the FIGS. 2 and 3.

After passing the coalescer element 5 the gas/liquid mixture flow altered to a substantial gas flow. In practise often a subsequent separations devices (e.g. axial recycle cyclones) are installed in the second compartment 6 of the vessel 2 to even further diminish the liquid contend on the resulting gas flow that finally leaves the vessel 2 via a gas outlet 12, indicated with arrow $P_5$.

Figure 2:
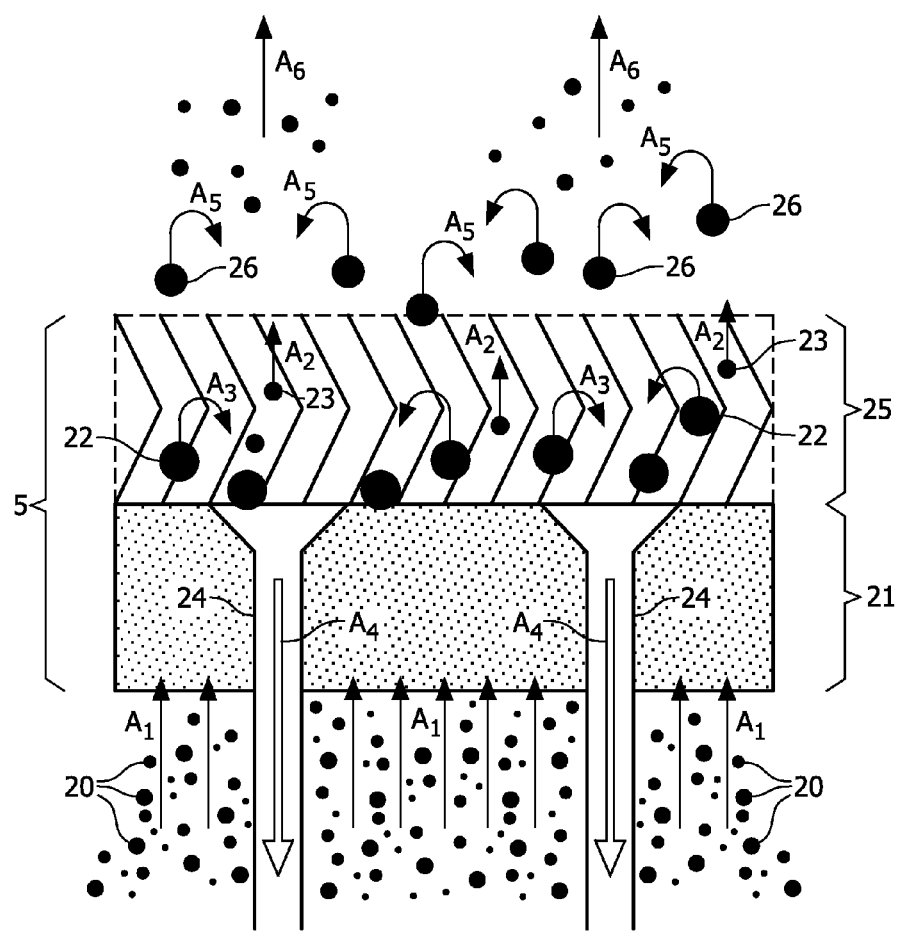
FIG. 2 shows a detailed cross-section view of the functioning of a coalescer with two different coalescer layers.

In FIG. 2 a part of the coalescer element 5 is shown in more detail. The gas/liquid mixture flow coming from below is indicated here with arrows $A_1$ and contains substantially smaller liquid particles 20. The gas/liquid mixture flow $A_1$ is guided through a first coalescer layer 21 a wire mash of tightly packed wires resulting in a halfway gas/liquid mixture flow $A_2$ comprising both; larger particles 22 and smaller liquid droplets 23. These larger particles 22 will due to gravitational forces drop down (see arrows $A_3$) and will for a substantial part enter downcomers 24 (discharge conduits) that will lead (see arrows $A_4$) the liquid to (not shown here) below the level of liquid at a reservoir 7 (see FIG. 1).

Now the resulting halfway gas/liquid mixture flow $A_2$ will continue to coalesce in a second coalescer layer 25, here a vane-type coalescer layer. Both the coalescer layers 21, 25 have a substantially constant layer thickness. In the second coalescer layer 25 the liquid particles 22 will again further coalesce to bigger particles 26 that due to their larger dimensions also will drop down (see arrows $A_5$). The substantially gas phase flow (arrow $A_6$) resulting after passage of the dual layered coalescer element 5 will only contain a limited contend of smaller liquid particles. Off course the exact geometry of the dual layered coalescer element 5 and the choice for the types of coalescer layers has to be determined dependant on the working conditions to be expected.

Figure 3:
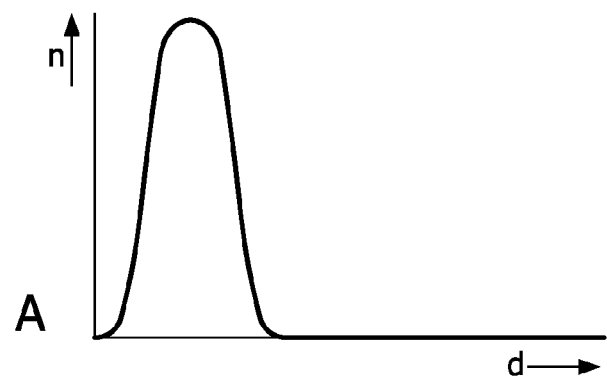
FIG. 3 three diagrams schematic showing the composition of number and volume of the liquid particles in a gas/liquid mixture in different stages of coalescing.
Figure 3:
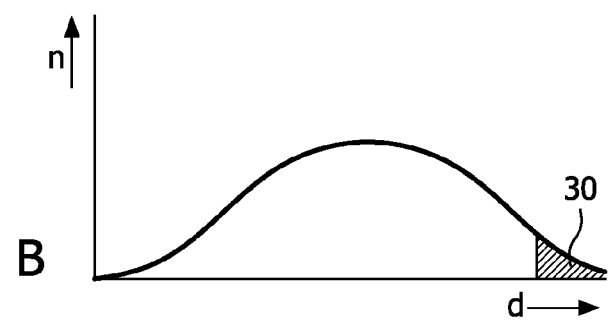
Figure 3:
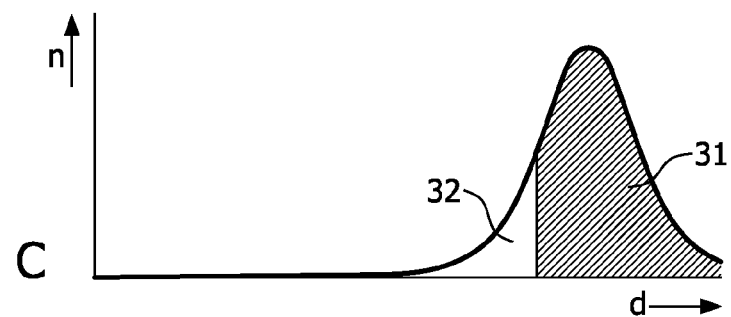

FIG. 3 shows three diagrams A, B, C schematic showing the composition of number and volume of the liquid particles in a gas/liquid mixture in different stages of coalescing. For further explanation of the diagrams reference is also made to the functioning of the coalescer element 5 of FIG. 2 and the accompanying text part. Diagram A shows the gas/liquid mixture flow that is indicated with arrows $A_1$ and that contains substantially smaller liquid particles 20; a large number (n) of the particles has a smaller diameter (d). Now in diagram B the situation is represented after passage of the first coalescer layer 21: the halfway gas/liquid mixture flow $A_2$ comprises now both; larger particles 22 and smaller liquid droplets 23. The average diameter (d) of the droplets has increased relative to the situation depicted in diagram A before entering the first coalescer layer 21. The fraction 30 of the largest particles 22 will due to gravitational forces drop down. In diagram C is depicted the situation after the halfway gas/liquid mixture flow $A_2$ has passed the second coalescer layer 25 where the liquid particles 22 again are coalesced further to bigger particles 26. The average diameter (d) of the droplets has again increased relative to the situation depicted in diagram B the mayor fraction 31 of again the large particles 26 will due to gravitational forces also drop down. The substantially gas phase flow (arrow $A_6$) resulting after passage of the dual layered coalescer element 5 will only contain a limited contend 32 of liquid particles.

Figure 4:
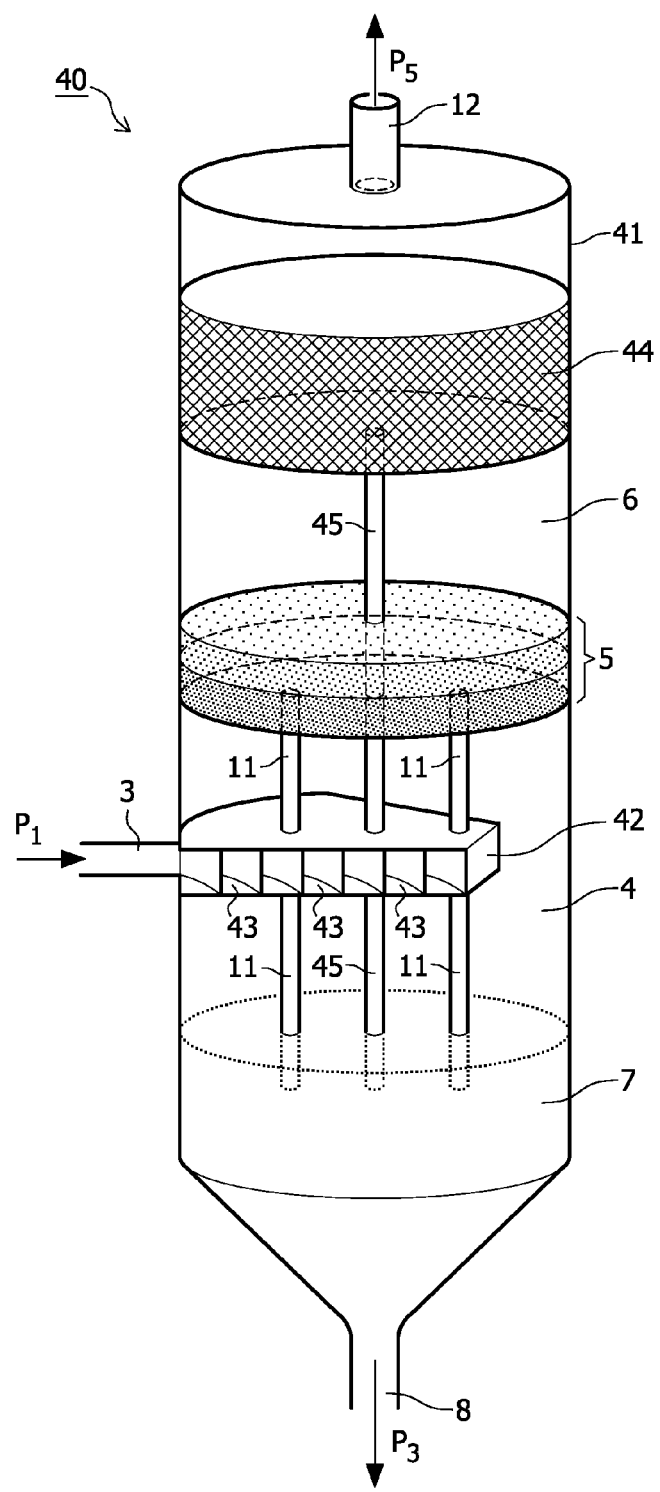
FIG. 4 shows a schematic cross-section through an alternative embodiment of a vertical apparatus for separating liquid from a gas/liquid mixture according to the invention.

FIG. 4 shows a schematic cross-section through an alternative embodiment of an apparatus 40 for separating liquid from a gas/liquid mixture according to the invention, now in a vertical positioned vessel 41. Corresponding components with the embodiment 1 as shown in FIG. 1 are designated with the same reference numerals. The gas/liquid mixture enters a vertical vessel 41 via inlet 3 according arrow $P_1$. In this embodiment 40 inlet 3 is connected to a inlet element 42 (also known as a vane feed inlet) that is provided with curved blades that guide the gas/liquid mixture flow laterally into the first compartment 4 of the vessel 41 and disperse the gas/liquid mixture flow evenly over the diameter of the vessel 41. After entering a first compartment 4 of the vessel 41 the mixture flows upward through the dual coalescer element 5 thus entering the second compartment 6 of the vessel 41. The dual coalescer element 5 is disposed horizontally over the complete diameter of the vessel 41 and forms the separation between first compartment 4 and second compartment 6. Larger liquid particles that separate from the gas/liquid mixture will drop down to arrive in a liquid reservoir 7. The reservoir 7 is provided with a liquid outlet 8 to drain liquid from the apparatus 40 as indicated with arrow $P_3$. During passage of the dual coalescer element 5 a part of the liquid particles in the gas/liquid mixture is caught and is fed by conduits 11 to the reservoir 7. One or more additional separators may be arranged above the coalescer element 5 for further limiting the liquid content of the gas phase fraction. An example of such additional separator 44 is a (pack of) cyclone separator(s) and is here in general indicated. The heavy (liquid) fraction resulting form this additional separator 44 is force downward via a feed pipe 45 to the reservoir 7. The resulting gas phase flow finally leaves the vessel 41 via a gas outlet 12, indicated with arrow $P_5$. For a proper functioning the inlet 3 connects to the vessel 41 above the liquid outlet 8.

Figure 5:
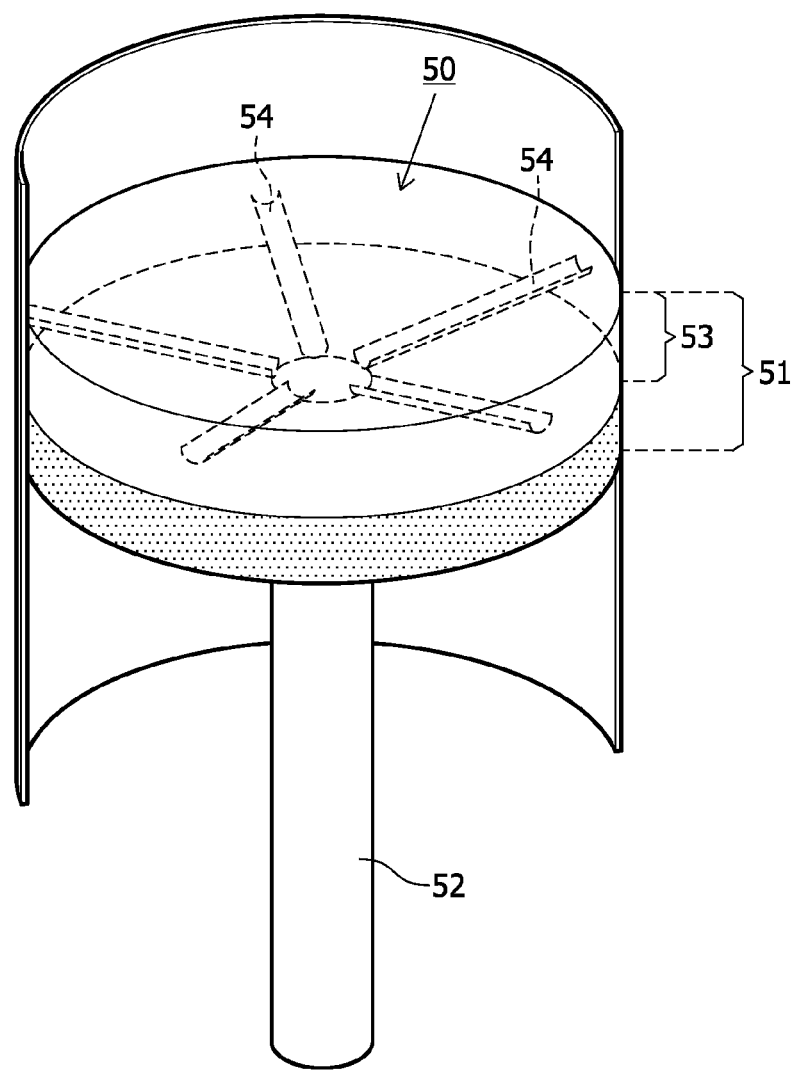
FIG. 5 shows a schematic perspective view on liquid collectors embedded in a coalescer connecting to a liquid feed.

Shown in FIG. 5 is a perspective view on a liquid collector 50 embedded in a dual coalescer element 51 connecting to a discharge conduit 52. In an upper coalescer layer 53 collecting troughs 54 are embedded that slope down to discharge conduit 52, which discharge conduit is located centrally in the middle of the dual coalescer element 51. However also the upper surface of the dual coalescer element 51 may be provided with a (not shown) collecting trough or collecting reservoir in which liquid can be collected. The collecting troughs 54 may alternatively e.g. also be half-pipes, U-shaped, or V-shaped.

The invention claimed is:

1. An apparatus for separating liquid from a gas/liquid mixture, comprising:
    a housing;
    a gas/liquid mixture inlet located at a lower side of the housing;
    a coalescer placed in the housing above the gas/liquid mixture inlet for increasing the average size of liquid droplets from the mixture passing the coalescer;
    at least one liquid feed, which liquid feed runs at least partially through the coalescer and ends at location below the gas/liquid mixture inlet;
    a liquid outlet for the separated liquid fraction located at a lower side of the housing under the coalescer; and
    a gas outlet for the separated gas fraction located at an upper side of the housing above the coalescer,
        wherein the coalescer comprises at least two different coalescer layers,
        the first coalescer layer causing a first concentration of liquid particles to accumulate in liquid droplets having a typical first size that is, on average, larger than the size of liquid droplets entering the first coalescer layer,
        and a second coalescer layer causing the first concentration of liquid particles emerging from the first coalescer layer to accumulate in liquid droplets having a typical second size that is, on average, larger than the size of the liquid droplets entering the second coalescer layer, and wherein
        the two coalescer layers are oriented substantially horizontally to one another.

2. The apparatus as claimed in claim 1, wherein the different coalescer layers comprise different types of coalescers.

3. The apparatus as claimed in claim 1, wherein the different coalescer layers comprise identical types of coalescers with different dimensioning of the coalescer elements.

4. The apparatus as claimed in claim 1, wherein the different coalescer layers are stacked substantially horizontal layers.

5. The apparatus as claimed in claim 1, wherein the apparatus comprises liquid collectors connecting to the liquid feed.

6. The apparatus as claimed in claim 5, wherein the liquid collectors are located in the coalescer.

7. The apparatus as claimed in claim 5, wherein the liquid collectors slope downward to the liquid feed.

8. The apparatus as claimed in claim 1, wherein the liquid feed runs at a central location.

9. The apparatus as claimed in claim 1, wherein at least one of the coalescer layers is a mesh coalescer.

10. The apparatus as claimed in claim 1, wherein at least one of the coalescer layers is a lamellar coalescer.

11. The apparatus as claimed in claim 1, wherein an upper part of the coalescer slopes downward to the liquid feed.

12. The apparatus as claimed in claim 1, wherein the apparatus comprises one liquid feed coaxially located in a vertical cylindrical vessel.

13. The apparatus as claimed in claim 5, wherein the apparatus comprises plural liquid collectors located on different vertical levels.

14. The apparatus as claimed in claim 6, wherein the apparatus comprises plural liquid collectors located on different vertical levels.

15. The apparatus as claimed in claim 7, wherein the apparatus comprises plural liquid collectors located on different vertical levels.

16. The apparatus as claimed in claim 8, wherein the apparatus comprises plural liquid collectors located on different vertical levels.

17. The apparatus as claimed in claim 9, wherein the apparatus comprises plural liquid collectors located on different vertical levels.

18. The apparatus as claimed in claim 10, wherein the apparatus comprises plural liquid collectors located on different vertical levels.

19. The apparatus as claimed in claim 11, wherein the apparatus comprises plural liquid collectors located on different vertical levels.

* * * * *